United States Patent
Borissov et al.

(10) Patent No.: US 7,844,583 B2
(45) Date of Patent: Nov. 30, 2010

(54) METHOD AND SYSTEM FOR OBTAINING FILES FROM A SET OF SOURCES

(75) Inventors: Lazar Borissov, Sofia (BG); Stefan Stoychev, Stara Zagora (BG)

(73) Assignee: SAP AG, Walldorf (DE)

( * ) Notice: Subject to any disclaimer, the term of this patent is extended or adjusted under 35 U.S.C. 154(b) by 380 days.

(21) Appl. No.: 12/024,460

(22) Filed: Feb. 1, 2008

(65) Prior Publication Data

US 2009/0198742 A1 Aug. 6, 2009

(51) Int. Cl.
*G06F 17/30* (2006.01)
(52) U.S. Cl. ........................ 707/703; 707/726
(58) Field of Classification Search .................. 707/753, 707/955, 703, 726, 809, 999.201
See application file for complete search history.

(56) References Cited

U.S. PATENT DOCUMENTS

| 7,421,690 B2* | 9/2008 | Forstall et al. ............... 718/100 |
| 2007/0038718 A1* | 2/2007 | Khoo et al. .................. 709/206 |
| 2008/0005247 A9* | 1/2008 | Khoo ......................... 709/206 |
| 2008/0046518 A1* | 2/2008 | Tonnison et al. ............ 709/206 |
| 2008/0109543 A1* | 5/2008 | Abanami et al. ............ 709/223 |

* cited by examiner

*Primary Examiner*—Cheryl Lewis
(74) *Attorney, Agent, or Firm*—Blakely Sokoloff Taylor & Zafman LLP

(57) ABSTRACT

A method and a system are described that involve obtaining information about a plurality of inbox objects, wherein each inbox object is linked to another inbox object via a set of operations, each operation having a priority. The set of operations are executed on a subset of the plurality of inbox objects to generate a modified subset of the plurality of inbox objects. The modified subset is scanned to extract a list of files. The extracted files are used by a maintenance procedure to replace files in a system with older information and thus to update the system.

20 Claims, 5 Drawing Sheets

METHOD AND SYSTEM FOR OBTAINING FILES FROM A SET OF SOURCES

FIELD OF INVENTION

Embodiments of the invention relate generally to the software arts, and, more specifically, to a method and a system for obtaining new files from a set of different sources to update a single file or a whole file system.

BACKGROUND

Updating operating systems, file systems, databases and any other system or unit containing data is a task of most computing maintenance procedures. The maintenance procedures are often executed by a maintenance tool, which may be in the form of a software application. Update operations ensure that a set of files is replaced by a second set of files that contains different information, which in most cases is newer to the first set of files.

When a system has to be updated with new content, that is, new files, there are two methods: 1) create a new procedure every time a system needs to be updated; or 2) create a standard procedure integrated into the system and modify only the content. Option 2 has a lot of advantages like focusing on new features only delivered with the content and not spending time and resources on the procedure itself. It also allows independent content providers easy delivery and integration. In addition, the standard procedure option separates content issues from maintenance procedure issues and thus provides quicker support and problem solving features.

However, option 2 has a drawback: a standard procedure expects data with a standard delivery format of the content for input. For example, there is a scenario with two different sources of content—an electronic delivery via the Internet as a set of files or a set of packed files with a file system structure inside and a DVD/CD content delivery. The structure of these contents may vary as well, from a small bug fix to a big system update. Therefore, a single maintenance procedure integrated into a system must be able to comprehend different formats and be flexible enough to allow integration of new formats.

As mentioned above, the two approaches are: 1) create a separate maintenance procedure for every delivery format; or 2) implement in the maintenance procedure separate support for every delivery format. Both approaches hide the fact that content recognition is a minor part of a maintenance procedure. The first approach duplicates a big part of the maintenance procedure and thus causes the need for double maintenance of the maintenance procedure itself. The second approach does not clearly separate content recognition from system update, which causes difficulties when tracking issues in the procedure and increases the test efforts because of the need to execute regression tests with every possible combination.

FIGURES

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

SUMMARY

A method and system for obtaining a plurality of inbox objects, wherein each inbox object is linked to another inbox object via a set of operations. The set of operations are executed on a subset of the plurality of inbox objects to generate a modified subset of the plurality of inbox objects. The modified subset is scanned to extract a list of files. These extracted files are used by a maintenance procedure to replace files in a system with older information and thus to update the system.

DETAILED DESCRIPTION

Figure 1:
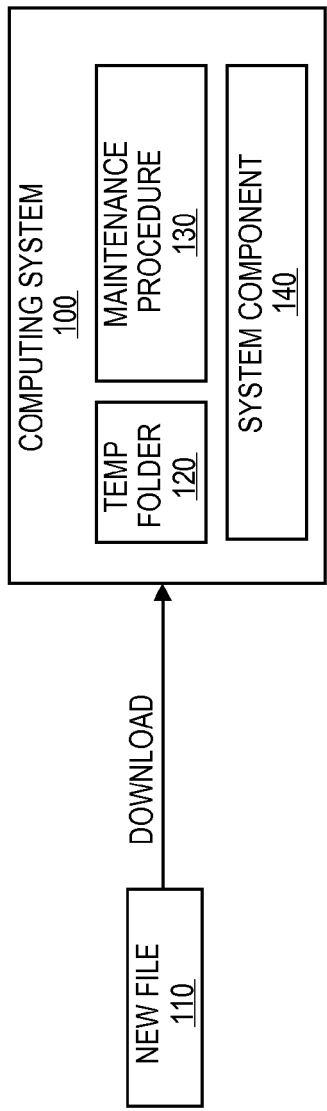
FIG. 1 is a block diagram of an embodiment of the invention for updating system components.

FIG. 1 is a block diagram of an embodiment for updating system components within computing system 100 using a template-based configuration. Within system 100, system component 140 needs to be updated. New file 110 is used by system 100 to update system component 140. New file 110 may be obtained via the Internet or via an external media such as a flash memory device, floppy disk, CD/DVD, etc. The new file 110 is stored in a temporary folder 120 in the computing system 100. A maintenance procedure 130 finds new file 110, defines that new file 110 is update content for system component 140. Maintenance procedure 130 updates the system component 140 with the new file 110 stored in temporary folder 120. In one embodiment, maintenance procedure 130 updates system component 140 with new file 110 from temporary folder 120.

Because new file 110 may have a different configuration then system component 140, maintenance procedure 130 configures new file 110 to be compatible with the system component 140 configuration. Maintenance procedure 130 stores the re-configured new file 110 in temporary folder 120. Maintenance procedure 130 re-configures new file 110 into a template-based configuration. The template-based configuration is used to provide a single unified input for system component 140 update.

Figure 2:
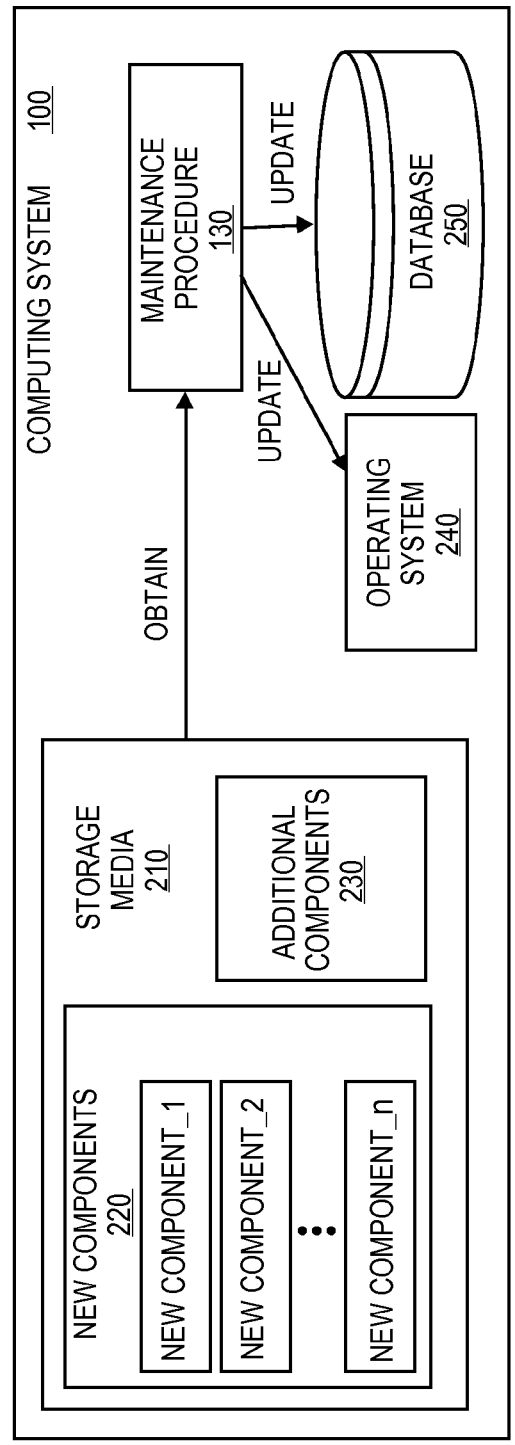
FIG. 2 is a block diagram of an embodiment of the invention of a storage medium for system components update.

FIG. 2 is a block diagram of an embodiment of a storage media 210 during system update. Storage media 210 contains new components 220 used by computing system 100 during system update. In one embodiment of the invention, new components 220 may be a new application server version delivered on storage media 210. Storage media 210 may be, for example a DVD, CD/DVD, etc. Storage media 210 contains new components 220 that are used to update an application server with any possible combination of operating systems and databases. The storage media 210 may also contain additional files 230, such as licensing information, that are not used during system update. Maintenance procedure 130 extracts only the new components 220 from the storage media 210 that are needed for updating system component 240. After the new components 220 are obtained, the maintenance procedure 130 updates the operating system 240 and database 250.

Figure 3:
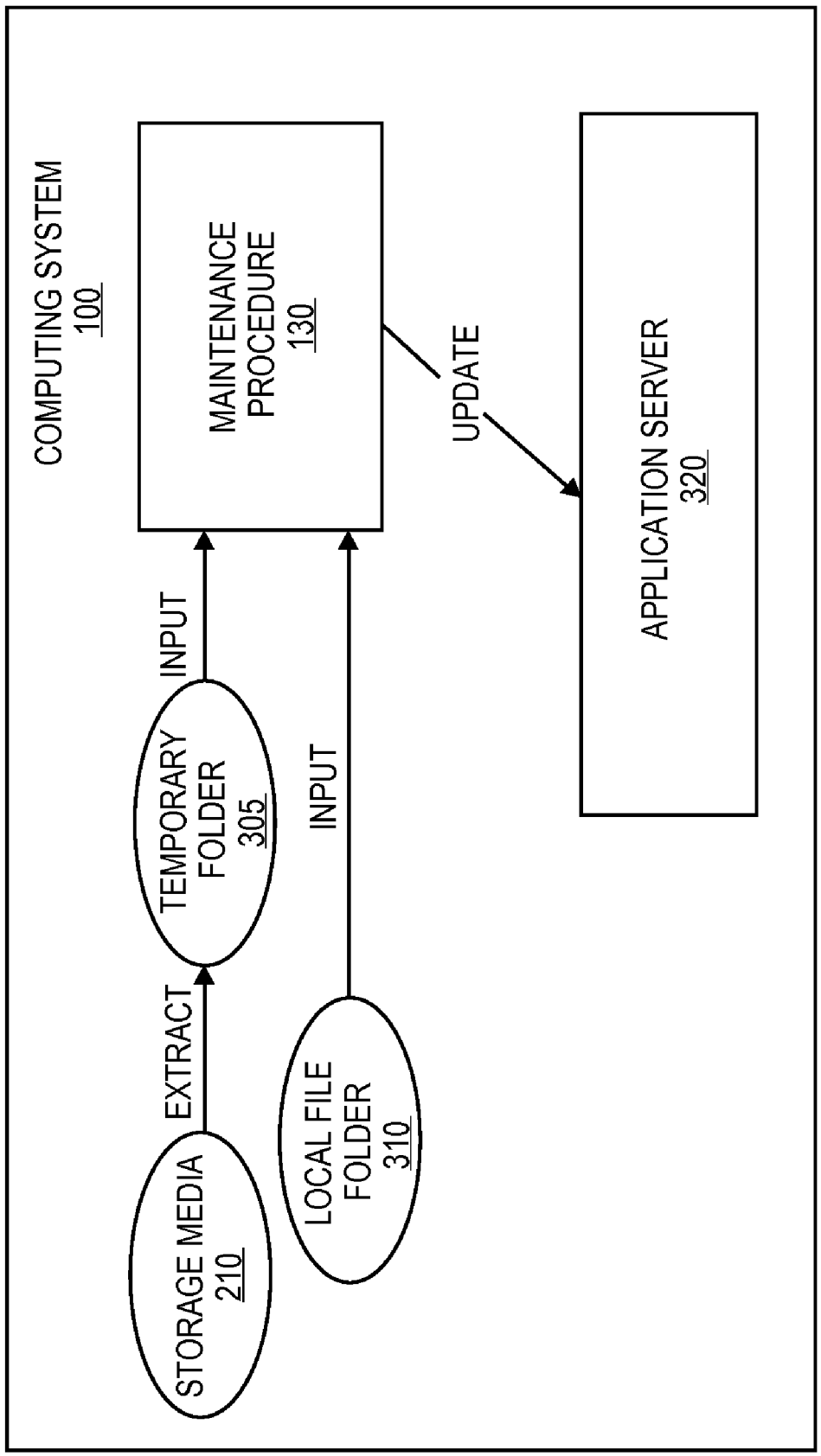
FIG. 3 is a block diagram of the embodiment described in FIG. 2.

FIG. 3 is a block diagram of another embodiment of computing system 100 for updating system components using a template-based configuration. In this embodiment of the invention, computing system 100 has to be updated with a plurality of components (e.g. files) from different sources. Some of the new components 220 may be located in a storage media 210, other components may reside in a local file folder 310. The new components 220 that are applicable for current operating system and database are extracted into a temporary folder 305. The files from the local file folder 310 and the files from the temp folder 305 are used to update system components 140 by maintenance procedure 130. If a file A from the local file folder 310 is the same as a file B from the temp folder 305, the maintenance procedure 130 extracts file B and thus no duplicate files exist. In another embodiment of the invention, it may be the case that the maintenance procedure extracts file A instead of file B. After all files are collected, the maintenance procedure updates application server 320. Those of skill in the art will recognize that a wide variety of implementations of the system and method described in this document are possible, and are not limited to the implementations set forth to exemplify the invention.

In this embodiment of the invention there may be multiple delivery mediums for delivery update content to system 100 (for example storage media 210, local file folder 310). These mediums may have different structures with different formats. In order for maintenance procedure 130 to use the different formats, the formats need to be re-configured for maintenance procedure 130. Thus, the content of storage media 210 is extracted and stored in temporary folder 305.

Embodiments of the invention provide a way to define a preparation phase in a template-based configuration. The preparation phase prepares files from a set of different data sources (e.g. the Internet, local folder, storage media, etc.) for processing by the maintenance procedure 130. The template-based configuration is to provide a single unified input of files for use by maintenance procedure 130 for updating system components 140.

Figure 4:
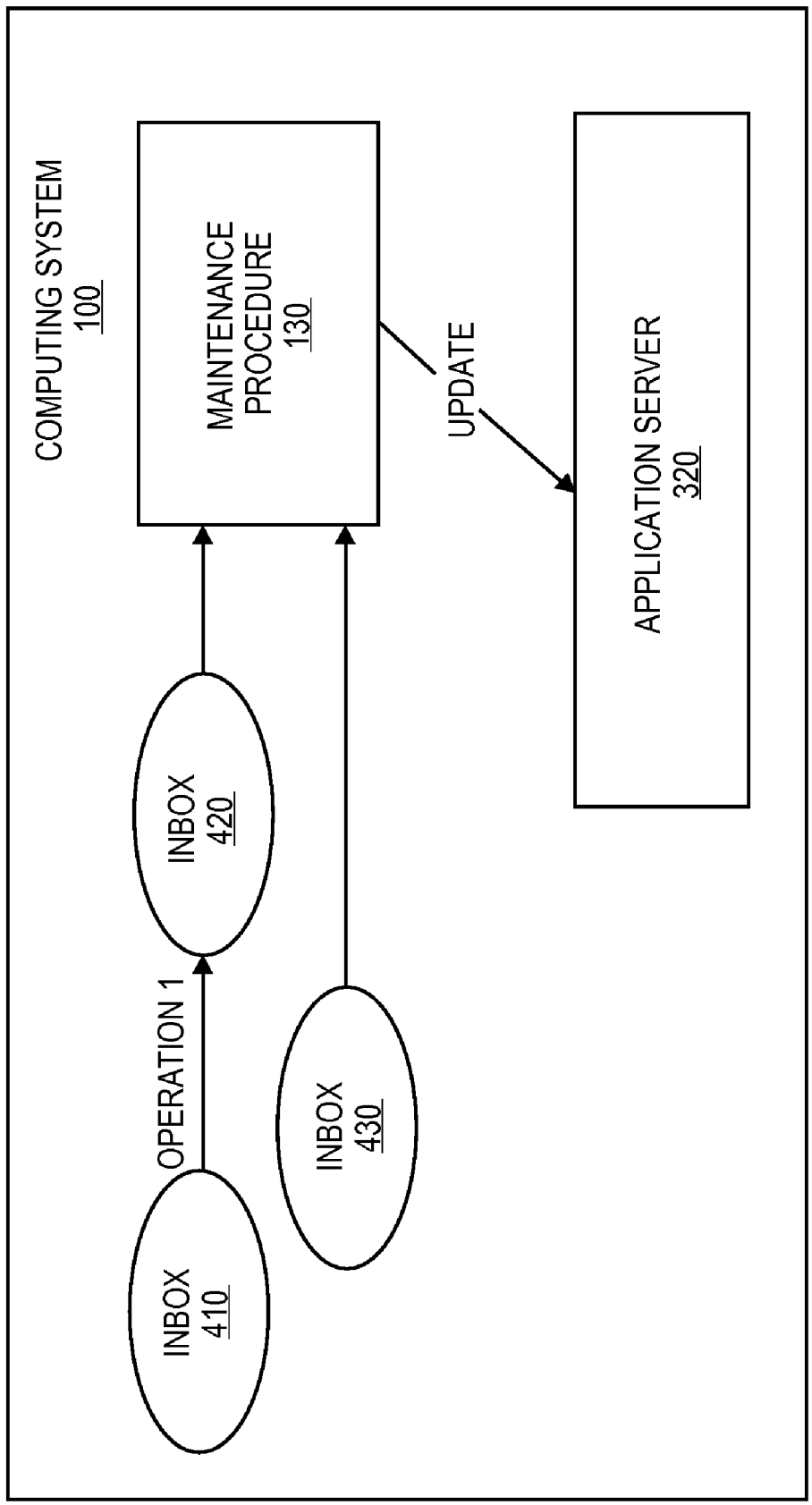
FIG. 4 is a diagram of one embodiment of the invention.

FIG. 4 is a block diagram of one embodiment of the invention. The data sources of FIG. 3 are represented as inbox objects. An inbox object is a data storage unit, which may be a local or a remote folder. In one embodiment of the invention, an inbox object may be a folder located in a remote physical machine and accessible via a network such as the Internet. In another embodiment of the invention, the inbox object may be a folder located in the local file system of a physical machine. In addition, the inbox object may contain a single file or a structure of subfolders with files or a combination of files and subfolders. Storage media 210 data source illustrated in FIG. 3 is represented as inbox 410, temp folder 305 is represented as inbox 420, and local file folder 310 is represented as inbox 430.

Every inbox object may have a priority parameter that indicates the priority of an inbox object over the rest of the inbox objects in the plurality. In one embodiment of the invention inbox 430 has higher priority than inbox 420. The inbox objects may be linked with each other via operations, which define a process with steps for execution. For example, inbox 410 is linked with inbox 420 via operation "extract", which when executed causes the content of inbox 410 to be extracted into inbox 420. The operations may also have priority, which defines an order of execution of the operation, i.e. the steps of the process. For example, if inbox 410 is linked with inbox 420 via operation_1 and inbox 430 is linked with inbox 420 via operation_2, which has lower priority, then operation_1 will be executed first.

The inbox objects and the operations between them define the preparation phase described above, which further defines the template-based configuration. It is a template-based configuration because the inbox objects do not have real locations. Only during runtime execution of the process, the inbox objects will be replaced with real locations and the operations will be executed according to their order. The result of the operations will provide a single unified input of files.

Figure 5:
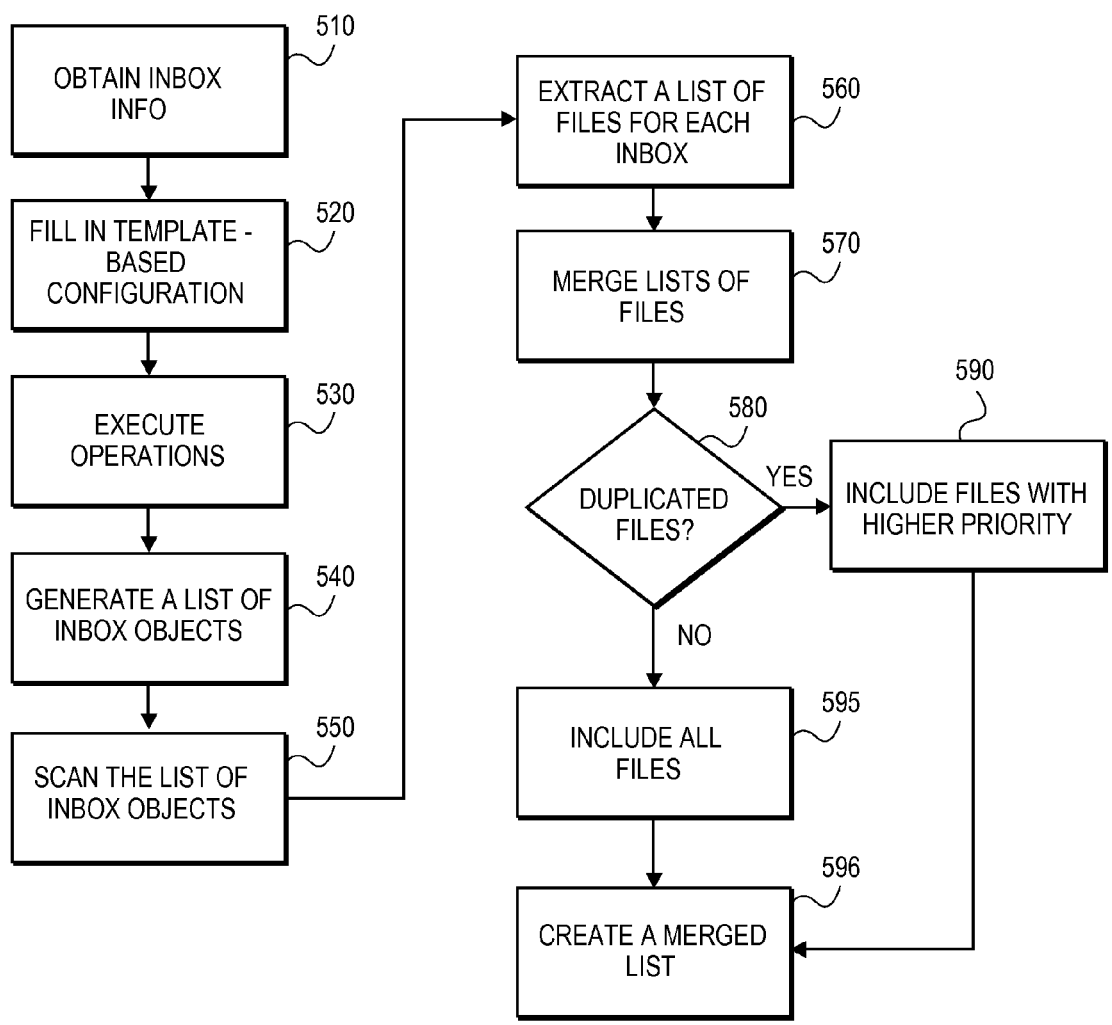
FIG. 5 is a flow diagram of one embodiment of the invention for updating system components.

FIG. 5 is a flow diagram of one embodiment of the invention for updating system components. At process block 510, detailed information about the available data sources, called inbox objects, is obtained. The information may be, for example, location, and priority of the inbox. At block 520, template-based configuration is filled in. The configuration defines the operations that link some of the inboxes. Each operation has a task such as "take element A and add it to element B". The tasks of operations may be filled in the template as well, in this way every time the procedure will execute one and the same tasks, or they may be filled in during runtime via a graphical user interface as input from a user. Using the obtained information about the inboxes, the process executes the operations 530 according to their priority. The operation with highest priority is executed first, the one with lowest—last (i.e., in descending order).

In one embodiment of the invention, there may be an operation that links inbox 410 with inbox 420 with the task: for example, use all files from inbox 410 and put them in inbox 420. Thus when executed, inbox 420 will contain all files from inbox 410 and all files that were in inbox 420 initially. After all operations are executed, the process generates a list of inbox objects 540, which content was modified by the operations and those inboxes that also provide content but are not linked with any operations. For example, the process may generate a list that contains the names of inbox 420 and inbox 430. These inbox objects are also referred to as "prepared" inboxes, that is, their content has been modified and is now prepared for a maintenance procedure. If inboxes 410 and 420 had their content structured in two different formats initially, at this stage the content of inbox 410 is distributed into inbox 420's structure and thus inbox 420 contains both contents in one structure and format.

Referring again to FIG. 5, at block 550, the content of the prepared inbox objects is scanned. At block 560, all files needed by the system are extracted from each inbox in a separate list. At block 570, the lists are merged to create a merged list of all files. If duplicate files exist, at block 580, the process continues at block 590. At block 590, the file associated with the inbox object having a higher priority is extracted. If no duplicate files exist, then, at block 595, all files are extracted. At block 596, the extracted files are merged to create a merged list of files. The list serves as input for a maintenance procedure.

Figure 6:
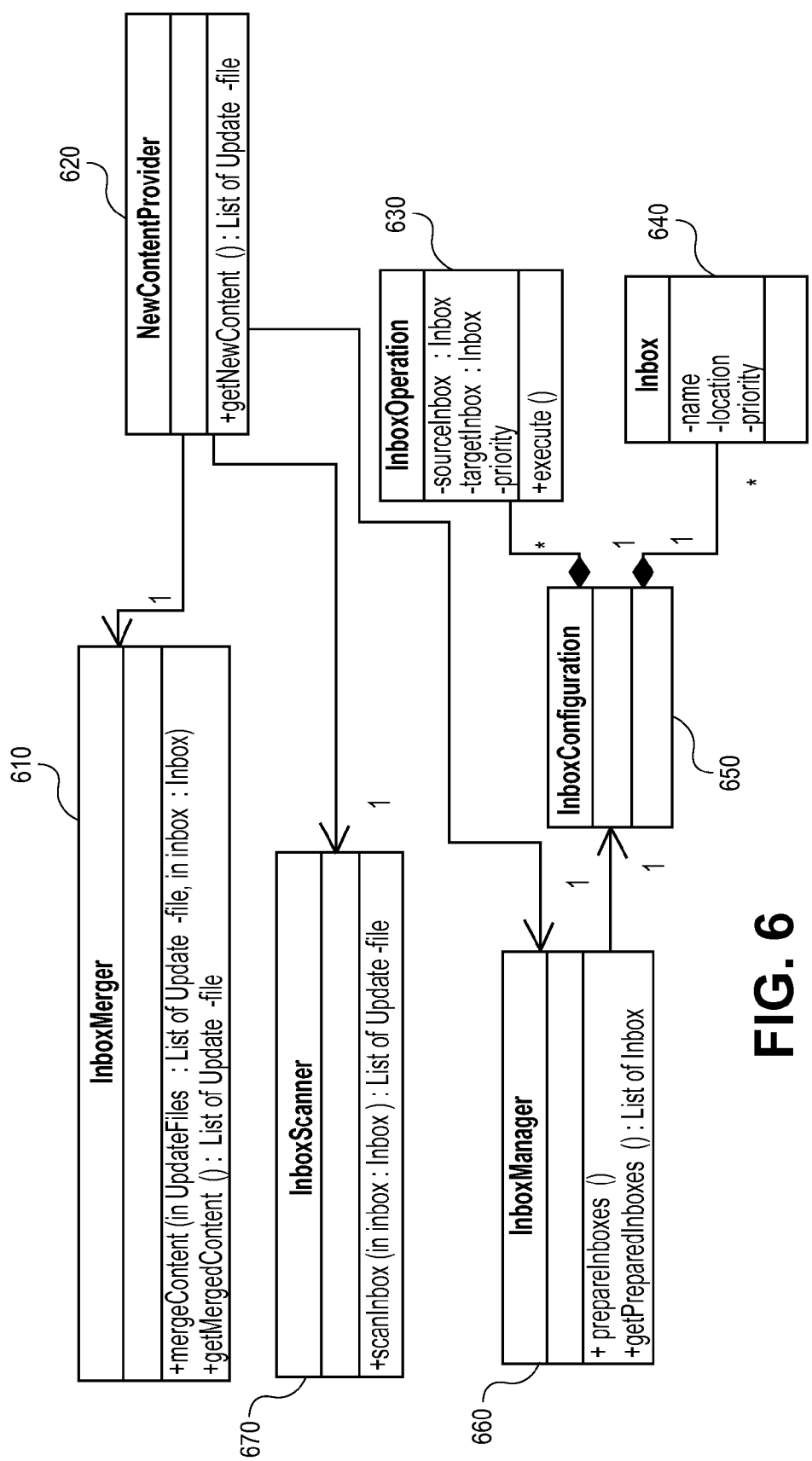
FIG. 6 is a relational diagram that shows a static class structural representation of one embodiment of the invention.

FIG. 6 is a relational diagram that shows a static class structural representation of one embodiment of the invention. Static class Inbox 640 provides information about an inbox object and includes the following parameters: 1) "name" that specifies the name of the inbox object; this parameter is not mandatory and is set when an inbox with such name exists; 2) "location" that specifies the location of the inbox object; this parameter is mandatory but its value is set during runtime execution of the process; and 3) "priority" that specifies the priority of the inbox object; this parameter is also mandatory and the lower priority value means the higher priority (e.g. like in UNIX environment); this parameter is applied when two same versions of one file exist.

InboxOperation class 630 defines a set of operations that process the content from a source inbox and transport the result to a target inbox. It includes the following parameters and method: 1) "sourceInbox" that specifies the inbox which provides data (e.g. new files for the system); source inbox may not differ from target inbox; 2) "targetInbox" that specifies the inbox to which the data is provided; it is a mandatory parameter and the content of the target inbox is changed during inbox operations; 3) "priority" that specifies the priority of the operation; this parameter is also mandatory and lower priority value means higher priority (e.g. like in UNIX environment); the priority specifies the order of execution of the operations; and 4) "execute( )" method for executing an operation.

InboxConfiguration 650 stores all the information that describes the set of inboxes, inbox operations, and their parameters provided from the Inbox 640 and InboxOperation 630 classes and thus forms a template-based configuration.

InboxManager 660 is the executor of the inbox configuration. The InboxConfiguration 650 provides information to the inbox manager how exactly the inbox landscape should be treated. The InboxManager 660 includes methods such as: 1) "prepareInboxes( )" that consecutively executes a list of the inbox operations provided by InboxOperation 630 as the list is executed in decreasing inbox operation priority order; and 2) "getPreparedInboxes" that returns an array of inbox objects.

InboxScanner 670 includes scanInbox( ) method that scans the inbox objects returned by InboxManager 660 and returns a list of files.

InboxMerger 610 accumulates and merges the result of each inbox scanning performed by InboxScanner 670. The InboxMerger includes the following methods: 1) "mergeContent" that merges the files returned by InboxScanner 670 and resolves issues with duplicated or conflicting content like two identical files for one and same system component based on inbox object's priority; and 2) "getMergedContent" that returns a merged list of files.

NewContentProvider 620 manages the work of InboxManager 660, InboxScaner 670 and InboxMerger 610. It includes method "getNewContent" that returns the list of files provided by the InboxMerger 610; the list serves as input for a maintenance procedure.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A computer-implemented method comprising:
obtaining information about a plurality of inbox objects, wherein an inbox object is linked to another inbox object via a set of operations, an operation being a process to be executed on the plurality of inbox objects, the operation having a priority;
identifying a subset of the plurality of inbox objects that are linked by the set of operations;
executing the set of operations, in a sequence according to the priority, on the subset to generate a modified subset of the plurality of inbox objects, the set of operations modifying a content of at least one of the plurality of inbox objects in the subset; and
extracting a list of files from each of the plurality of inbox objects of the modified subset.

2. The method of claim 1, wherein each inbox object is a local or remote file folder having one of a file, a file folder, or a combination of the file and the file folder.

3. The method of claim 1, wherein obtaining information about the plurality of inbox objects comprises obtaining a name, a location, and a priority of the inbox object.

4. The method of claim 1 further comprising defining a template-based configuration based on the obtained information and the set of operations between the plurality of inbox objects.

5. The method of claim 1, wherein executing the set of operations comprises providing a list of the plurality of inbox objects in the subset modified by the set of operations.

6. The method of claim 1 further comprising merging the extracted list of files from each of the plurality of inbox objects to create a merged list.

7. The method of claim 6, wherein each inbox object comprises a priority parameter in respect to other inbox objects.

8. The method of claim 7, wherein merging comprises including in the merged list a file associated with the inbox object having a higher priority when the file is duplicated in the extracted list of files of the plurality of inbox objects.

9. A system for updating system components, the system comprising:
a first module that
obtains information about a plurality of inbox objects,
executes operations in a sequence according to a priority parameter on a subset of the plurality of inbox objects based on the information obtained to generate a modified subset of the plurality of inbox objects,
wherein the subset includes an inbox object that is linked to another inbox object via an operation, and
wherein the operation is a process to be executed on the plurality of inbox objects; and
a second module that extracts a list of files from each of the plurality of inbox objects of the modified subset.

10. The system of claim 9 further comprising a third module that defines the inbox object with a name, a location, and a priority.

11. The system of claim 9 further comprising:
a fourth module that merges the list of files extracted from each of the plurality of inbox objects in the modified subset to create a merged list.

12. The system of claim 11, wherein each inbox object comprises a priority parameter in respect to the other inbox objects.

13. The system of claim 11, wherein the fourth module includes in the merged list a file associated with the inbox object having a higher priority when the file is duplicated in the extracted list of files of the plurality of inbox objects of the modified subset.

14. The system of claim 9, wherein each inbox object is a local or remote folder having one of a file, a file folder, or a combination of the file and the file folder.

15. A machine readable medium having instructions therein that when executed by the machine cause the machine to:
- obtain information about a plurality of inbox objects, wherein an inbox object is linked to another inbox object via a set of operations, an operation being a process to be executed on the plurality of inbox objects, the operation having a priority;
- execute the set of operations in a sequence according to the priority, on a subset of the plurality of inbox objects to generate a modified subset of the plurality of inbox objects, the set of operations modifying a content of at least one of the plurality of inbox objects in the subset; and
- extract a list of files from each of the plurality of inbox objects of the modified subset.

16. The machine readable medium of claim 15, wherein instructions causing the machine to obtain information about a plurality of inbox objects comprise instructions causing the machine to:
- obtain a name, a location, and a priority of the inbox object.

17. The machine readable medium of claim 16 having instructions that when executed further cause the machine to:
- define a template-based configuration based on the obtained information and the set of operations between the inbox objects.

18. The machine readable medium of claim 15 having instructions that when executed further cause the machine to:
- merge the extracted list of files from each of the plurality of inbox objects to create a merged list.

19. The machine readable medium of claim 18, wherein each inbox object comprises a priority parameter in respect to the other inbox objects.

20. The machine readable medium of claim 19 having instructions that when executed further cause the machine to:
- include in the merged list a file associated with the inbox object having a higher priority when the file is duplicated in the extracted list of files of the plurality of inbox objects.

* * * * *